(12) United States Patent
Sugie et al.

(10) Patent No.: US 10,166,847 B2
(45) Date of Patent: Jan. 1, 2019

(54) VEHICLE SIDE PORTION STRUCTURE

(71) Applicant: TOYOTA JIDOSHA KABUSHIKI KAISHA, Toyota-shi, Aichi-ken (JP)

(72) Inventors: Kazuki Sugie, Miyoshi (JP); Masanobu Ohmi, Kasugai (JP); Kosuke Sakakibara, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 50 days.

(21) Appl. No.: 15/450,388

(22) Filed: Mar. 6, 2017

(65) Prior Publication Data

US 2017/0313166 A1    Nov. 2, 2017

(30) Foreign Application Priority Data

Apr. 27, 2016  (JP) .................................. 2016-089606

(51) Int. Cl.
| | |
|---|---|
| *B60J 5/04* | (2006.01) |
| *B62D 25/02* | (2006.01) |
| *E05B 77/04* | (2014.01) |
| *E05B 77/10* | (2014.01) |
| *E05B 83/38* | (2014.01) |

(52) U.S. Cl.
CPC ........... *B60J 5/0429* (2013.01); *B60J 5/0427* (2013.01); *B60J 5/0479* (2013.01); *B62D 25/025* (2013.01); *E05B 77/04* (2013.01); *E05B 77/10* (2013.01); *E05B 83/38* (2013.01)

(58) Field of Classification Search
CPC ........ B60J 5/0412; B60J 5/042; B60J 5/0422; B60J 5/0423; B60J 5/0427; B60J 5/0429; B60J 5/0433; B60J 5/0479; E05B 83/38

USPC .................................... 296/146.5, 146.6, 150
See application file for complete search history.

(56) References Cited

U.S. PATENT DOCUMENTS 2,827,321 A * 3/1958 Leslie .................... B60J 5/0479
                                                    292/144
6,382,705 B1 * 5/2002 Lang ..................... B60J 5/0479
                                                    296/146.12
(Continued)

FOREIGN PATENT DOCUMENTS

| FR | 2917048 A1 * | 12/2008 |
| JP | 2004-009975 A | 1/2004 |
| JP | 2004-027811 A | 1/2004 |

(Continued)

OTHER PUBLICATIONS

English translation of FR 2917048; retreived Jun. 18, 2018 via PatentTranslate located at www.epo.org. (Year: 2018).*

*Primary Examiner* — Jason S Daniels
(74) *Attorney, Agent, or Firm* — Oliff PLC

(57) ABSTRACT

A vehicle side portion structure includes a front side door and a rear side door of a vehicle that does not have a center pillar. A lock member is disposed at a vertical direction lower portion of one side door of the front side door and the rear side door. When the one side door is closed, the lock member engages with the other side door to lock the one side door. A reinforcement member is provided inside the one side door at the vertical direction lower portion. A part of the reinforcement member is disposed on an upper side of the lock member so that the lock member is surrounded by the reinforcement member and the peripheral edge portion of the one side door as seen in a side view of the vehicle.

10 Claims, 8 Drawing Sheets

(56) References Cited

U.S. PATENT DOCUMENTS

| | | | | |
|---|---|---|---|---|
| 6,659,537 B2* | 12/2003 | Moriyama | ............ | B60J 5/0412 |
| | | | | 296/146.12 |
| 2003/0160476 A1* | 8/2003 | Moriyama | ............... | B60J 5/043 |
| | | | | 296/202 |

FOREIGN PATENT DOCUMENTS

| JP | 2004-090670 A | 3/2004 |
|---|---|---|
| JP | 2004-143835 A | 5/2004 |

\* cited by examiner

VEHICLE SIDE PORTION STRUCTURE

CROSS-REFERENCE TO RELATED APPLICATION

This application is based on and claims the benefit of priority of Japanese Patent Application No. 2016-089606, filed on Apr. 27, 2016, the entire contents of which are incorporated herein by reference.

FIELD

The embodiments discussed herein are related to a vehicle side portion structure.

BACKGROUND

Patent Document 1 (Japanese Patent Application Laid-open (JP-A) No. 2004-009975) discloses a door structure for a vehicle side portion that does not have a center pillar. In order to improve safety at the time of a side impact, the door structure has a reinforcement that covers, from the vehicle outer side, three door locks provided in a vehicle vertical direction upper portion, middle portion, and lower portion of the door structure. In this door structure, a side impact load is dispersed in the vertical direction by the reinforcement.

Examples of configurations where, in a door structure for a vehicle side portion that does not have a center pillar, lock mechanisms are provided in the vehicle vertical direction upper portion, middle portion, and lower portion of the door structure include those disclosed in patent document 2 (JP-A No. 2004-090670) and patent document 3 (JP-A No. 2004-027811).

Considering a side impact between a barrier and a vehicle, depending on the position of the bumper of the barrier it is easy for the impact load to be input to the lock member in the vertical direction lower portion of the vehicle. However, in the door structure disclosed in patent document 1 (JP-A No. 2004-009975), there is room for improvement in terms of improving safety performance at the time of a side impact by effectively protecting the lock member disposed in the vehicle vertical direction lower portion.

SUMMARY

In consideration of the above circumstances, it is an object of the present invention to obtain a vehicle side portion structure that can protect the lock member disposed in the vehicle vertical direction lower portion.

A vehicle side portion structure pertaining to a first aspect includes: front and rear side doors provided at a side portion of a vehicle that does not have a center pillar; a lock member provided at at least one side door among the front and rear side doors, the lock member being disposed at a vehicle vertical direction lower portion of the one side door on another side door side thereof and, when the one side door is closed, engaging with the other side door or the vehicle body to thereby lock the one side door; and a reinforcement member provided inside the one side door at the vehicle vertical direction lower portion thereof, with at least part of the reinforcement member being disposed on an upper side of the lock member so that the lock member is surrounded by the reinforcement member and a peripheral edge portion of the one side door as seen in a vehicle side view.

According to the vehicle side portion structure pertaining to the first aspect, the front and rear side doors are provided at the side portion of the vehicle that does not have a center pillar. The lock member is disposed at the vehicle vertical direction lower portion, on the other side door side thereof, of at least one side door among the front and rear side doors. Additionally, when the one side door is closed, the lock member engages with the other side door or the vehicle body to thereby lock the one side door. Furthermore, the reinforcement member is provided inside the one side door at the vehicle vertical direction lower portion thereof, and at least part of the reinforcement member is disposed on the upper side of the lock member so that the lock member is surrounded by the reinforcement member and the peripheral edge portion of the one side door as seen in a vehicle side view. Because of this, at the time of a side impact to the vehicle, the lock member disposed in the vehicle vertical direction lower portion of the one side door is effectively protected by the reinforcement member and the peripheral edge portion of the one side door. For this reason, the load at the time of a side impact is kept from being transmitted to the lock member disposed in the vehicle vertical direction lower portion of the one side door.

A vehicle side portion structure pertaining to a second aspect is the vehicle side portion structure pertaining to the first aspect, wherein the reinforcement member is disposed on a vehicle width direction outer side of the lock member.

According to the vehicle side portion structure pertaining to the second aspect, the reinforcement member is disposed inside the one side door on the vehicle width direction outer side of the lock member, so the load at the time of a side impact is input at an early stage to the reinforcement member, and the load is dispersed to the peripheral edge portion of the one side door. For this reason, the load at the time of a side impact can be effectively kept from being transmitted to the lock member.

A vehicle side portion structure pertaining to a third aspect is the vehicle side portion structure pertaining to the first aspect, wherein the one side door includes an inner panel disposed on a vehicle width direction inner side and an outer panel disposed on a vehicle width direction outer side of the inner panel, and the reinforcement member is joined to both the inner panel and the outer panel.

According to the vehicle side portion structure pertaining to the third aspect, the one side door includes the inner panel and the outer panel disposed on the vehicle width direction outer side of the inner panel, and the reinforcement member is joined to both the inner panel and the outer panel. Because of this, the reinforcement member can be more stably supported by the inner panel and the outer panel compared to a case where the reinforcement member is joined only to one of the inner panel and the outer panel.

A vehicle side portion structure pertaining to a fourth aspect is the vehicle side portion structure pertaining to the first aspect, wherein when the front and rear side doors are closed, at least part of the reinforcement member overlaps with the other side door as seen in a vehicle side view.

According to the vehicle side portion structure pertaining to the fourth aspect, when the front and rear side doors are closed, at least part of the reinforcement member overlaps with the other side door as seen in a vehicle side view, so the load at the time of a side impact is transmitted from the reinforcement member to the other side door. For this reason, the impact load can be supported by both side doors.

A vehicle side portion structure pertaining to a fifth aspect is the vehicle side portion structure pertaining to the first aspect, wherein a rocker extends along a vehicle forward and rearward direction at a vehicle vertical direction lower portion of the side portion of the vehicle, and when the one side door is closed, at least part of the reinforcement member overlaps with the rocker as seen in a vehicle side view.

According to the vehicle side portion structure pertaining to the fifth aspect, the rocker extends along the vehicle forward and rearward direction at the lower portion of the side portion of the vehicle, and when the one side door is closed, at least part of the reinforcement member overlaps with the rocker as seen in a vehicle side view. Because of this, some of the load at the time of a side impact is transmitted to the rocker, and the impact load can be supported by the frame of the vehicle body. For this reason, the lock member can be efficiently protected.

A vehicle side portion structure pertaining to a sixth aspect is the vehicle side portion structure pertaining to the first aspect, wherein one end portion of the reinforcement member is joined to a peripheral edge portion of the one side door on the other side door side thereof, and the other end portion of the reinforcement member is joined to the peripheral edge portion of the vehicle vertical direction lower portion of the one side door.

According to the vehicle side portion structure pertaining to the sixth aspect, the one end portion of the reinforcement member is joined to the peripheral edge portion of the one side door on the other side door side thereof, and the other end portion of the reinforcement member is joined to the peripheral edge portion of the vehicle vertical direction lower portion of the one side door. Because of this, a closed region that is substantially triangular in shape is formed by the corner portion of the peripheral edge portion on the lower side of the one side door and the reinforcement member, and at the time of a side impact the load can be dispersed by the sides of the substantial triangle. For this reason, the lock member disposed in the vehicle vertical direction lower portion of the one side door can be more reliably protected.

A vehicle side portion structure pertaining to a seventh aspect is the vehicle side portion structure pertaining to the first aspect, wherein inside the one side door, another reinforcement member is provided, which is disposed along the vehicle vertical direction on a vehicle width direction outer side of the lock member and joined to an upper end portion and a lower end portion of the one side door, and the reinforcement member is disposed on the vehicle width direction outer side of the other reinforcement member.

According to the vehicle side portion structure pertaining to the seventh aspect, the other reinforcement member disposed along the vehicle vertical direction and joined to the upper end portion and the lower end portion of the one side door is provided on the vehicle width direction outer side of the lock member. Moreover, the reinforcement member is disposed on the vehicle width direction outer side of the other reinforcement member. For this reason, at the time of a side impact to the vehicle, the load transmitted to the reinforcement member is transmitted to the other reinforcement member disposed on the vehicle width direction inner side of the reinforcement member, and the load is dispersed in the vehicle vertical direction by the other reinforcement member. For this reason, the load at the time of a side impact is more reliably kept from being transmitted to the lock member.

Additionally, according to the vehicle side portion structure pertaining to the present disclosure, the lock member disposed in the vehicle vertical direction lower portion can be protected.

DESCRIPTION OF EMBODIMENTS

Figure 1:
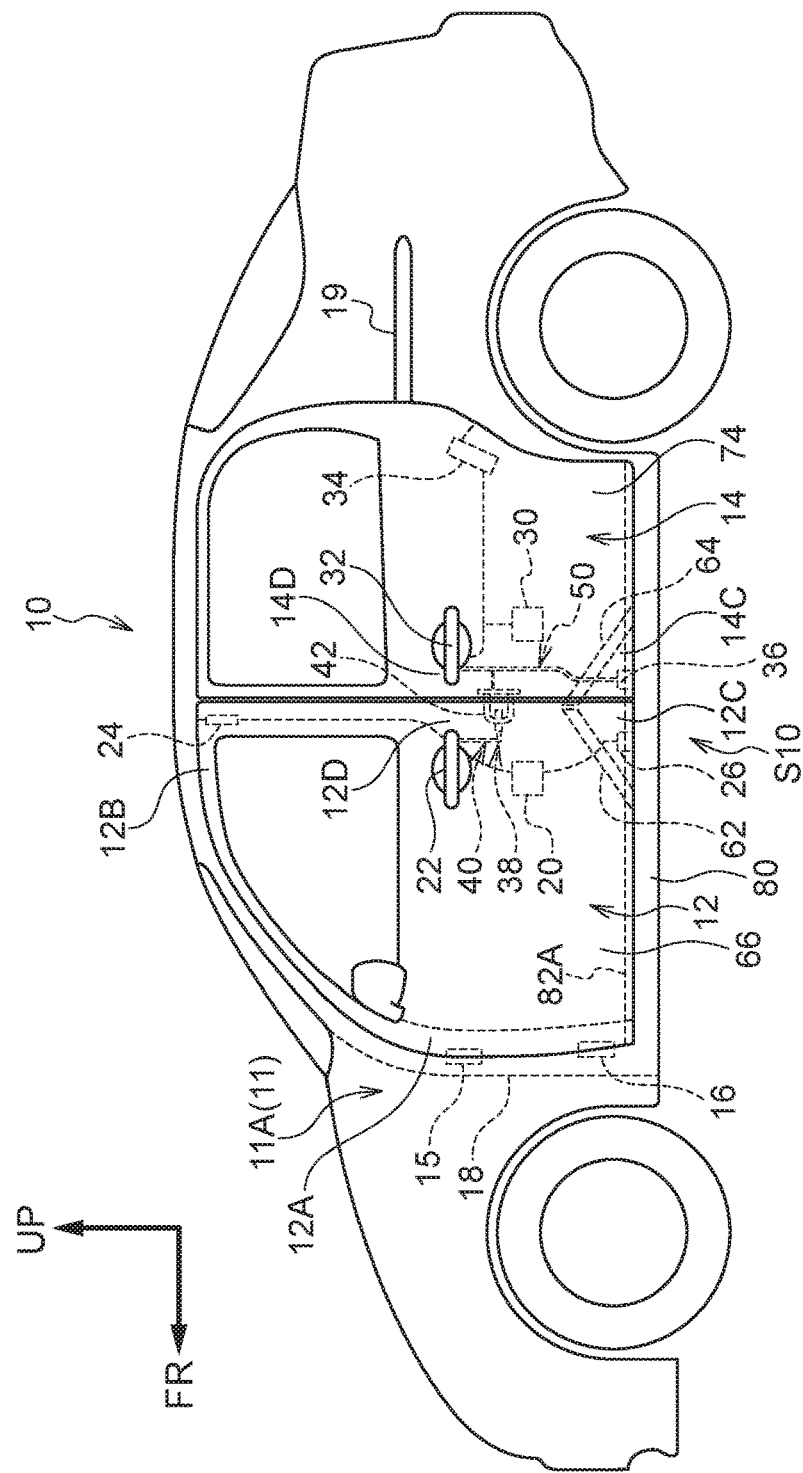
FIG. 1 is a side view showing a side portion of a vehicle to which a vehicle side portion structure pertaining to a first embodiment is applied.

Vehicle side portion structures pertaining to embodiments of the present invention will be described on the basis of the drawings. It should be noted that arrow FR appropriately shown in the drawings indicates a vehicle forward direction, arrow UP indicates a vehicle upward direction, and arrow IN indicates an inward direction in a vehicle width direction.

First Embodiment

A vehicle side portion structure S10 pertaining to a first embodiment will be described below using FIG. 1 to FIG. 6.

In FIG. 1 a vehicle 10 to which the vehicle side portion structure S10 of the first embodiment has been applied is shown by way of a side view. As shown in FIG. 1, the vehicle 10 of the first embodiment is a center-pillar-less vehicle that does not have a center pillar, and in a side portion 11A of a vehicle body 11 thereof are provided a front side door 12 and a rear side door 14 serving as front and rear side doors. As an example, in the first embodiment, the front side door 12 is a swinging door and the rear side door 14 is a sliding door.

The front side door 12 has a front end portion 12A attached to a front pillar 18 by an upper and lower pair of hinges 15 and 16, and the front side door 12 is swingable between a closed position and an open position. When opening the front side door 12 from the closed position shown in FIG. 6, the front side door 12 is swung outward in the vehicle width direction (the direction of arrow R in FIG. 6) about the hinges 15 and 16.

The rear side door 14 has rollers (not shown in the drawings) serving as a slide mechanism, and the rear side door 14 is slidable between a closed position and an open position by means of these rollers and a rail 19 that is provided in the vehicle body 11 and serves as a slide mechanism. When opening the rear side door 14 from the closed position shown in FIG. 6, the rear side door 14 is first moved obliquely in the vehicle rearward direction and outward (the direction of arrow S in FIG. 6). As a result, there are no restrictions on the order in which the front side door 12 and the rear side door 14 are opened; one can be opened and closed even while the other is closed.

As shown in FIG. 1, an upper door lock device 24 provided in a vehicle vertical direction upper portion 12B of the front side door 12 and a lower door lock device 26 serving as a lock member provided in a vehicle vertical direction lower portion 12C of the front side door 12 are provided in a rear end portion (i.e., the end portion on the rear side door 14 side) of the front side door 12. Furthermore, a front side door handle 22 and a door controller 20 disposed inside the front side door 12 on the lower side of the front side door handle 22 are provided in a vehicle vertical direction middle portion 12D of the front side door 12. The door controller 20 is electrically connected to an outside handle and an inside handle of the front side door handle 22 and to the lower door lock device 26 and is electrically connected to the outside handle and the inside handle of the front side door handle 22 and to the upper door lock device 24.

The door controller 20 ensures that, when the front side door 12 is locked, the front side door 12 does not open even if the outside handle and the inside handle of the front side door handle 22 are operated (e.g., the door controller 20 invalidates the operation). Furthermore, the door controller 20 ensures that, when the front side door 12 is unlocked, the front side door 12 opens when the outside handle and the inside handle of the front side door handle 22 are operated (e.g., the door controller 20 validates the operation).

The rear side door 14 is equipped with a rear door lock device 34 provided in the vehicle forward and rearward direction rear end portion of the rear side door 14 and a lower door lock device 36 provided in a vehicle vertical direction lower portion 14C of the front end portion (i.e., the end portion on the front side door 12 side) of the rear side door 14. Furthermore, a rear side door handle 32 and a door controller 30 disposed inside the rear side door 14 on the lower side of the rear side door handle 32 are provided in a vehicle vertical direction middle portion 14D of the rear side door 14. The door controller 30 is electrically connected to an outside handle and an inside handle of the rear side door handle 32 and to the rear door lock device 34.

The door controller 30 ensures that, when the rear side door 14 is locked, the rear side door 14 does not open even if the outside handle and the inside handle of the rear side door handle 32 are operated (e.g., the door controller 30 invalidates the operation). Furthermore, the door controller 30 ensures that, when the rear side door 14 is unlocked, the rear side door 14 opens when the outside handle and the inside handle of the rear side door handle 32 are operated (e.g., the door controller 30 validates the operation).

Figure 2:
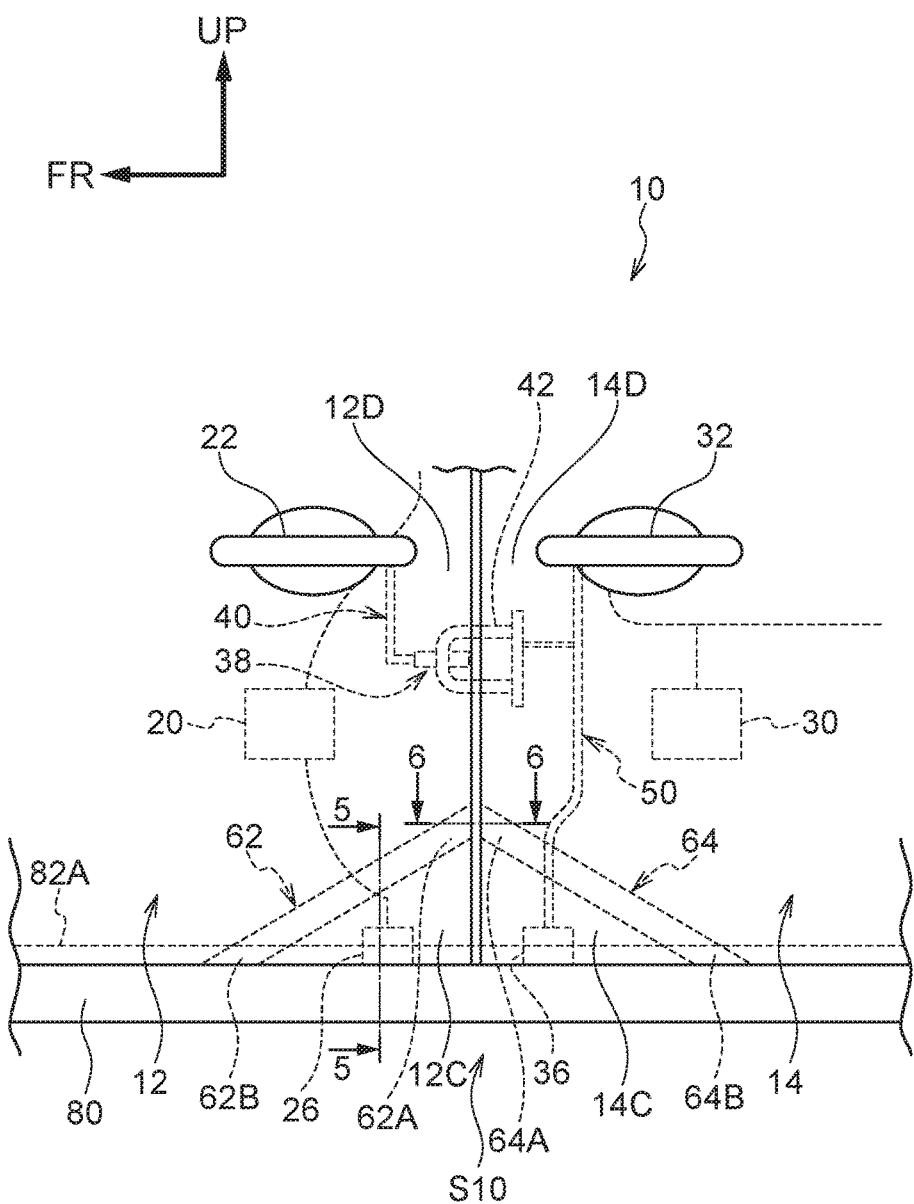
FIG. 2 is an enlarged side view of a lower portion of the side portion of the vehicle shown in FIG. 1 and shows lower door lock devices disposed in a front side door and a rear side door.

As shown in FIG. 1 and FIG. 2, a door coupling device 38 is provided in the vehicle vertical direction middle portion 12D in the rear end portion of the front side door 12. A link mechanism 40 is provided between the door coupling device 38 and the front side door handle 22. Furthermore, a striker 42 is provided in the vehicle vertical direction middle portion 14D in the front end portion of the rear side door 14.

Figure 3:
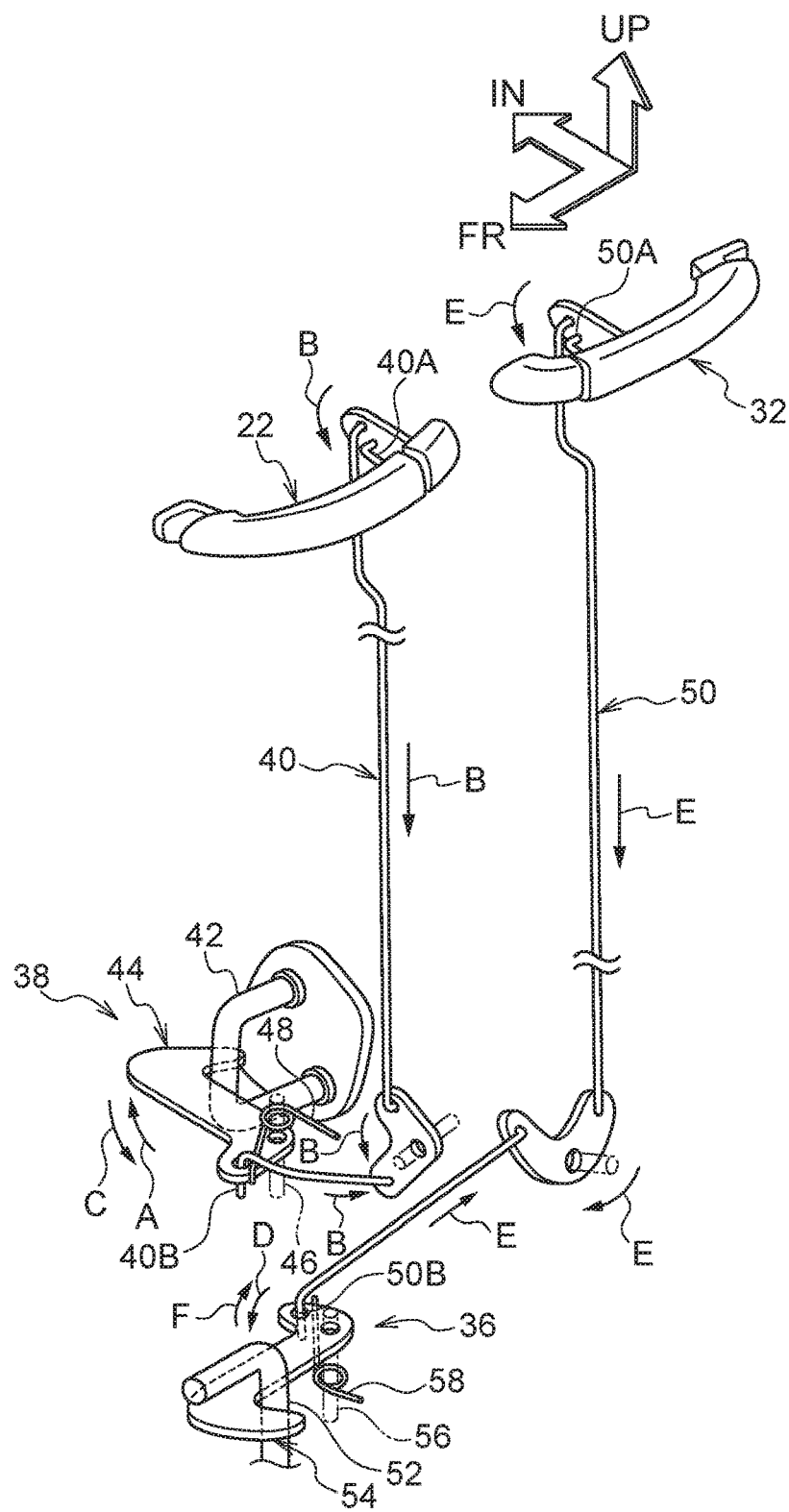
FIG. 3 is a perspective view showing a link mechanism of the front side door and a link mechanism of the rear side door, which are used in the vehicle side portion structure shown in FIG. 1.

As shown in FIG. 3, one end portion 40A of the link mechanism 40 is coupled to the front side door handle 22, and a hook 44 is coupled to the other end portion 40B. The hook 44 is swingably supported on a swing shaft 46, and the hook 44 is urged, by urging means 48 such as a coil spring, for example, in a direction (e.g., the direction of arrow A in FIG. 3) in which it becomes coupled to the striker 42. Consequently, when the front side door handle 22 is operated to open the front side door 12, the movement of the link mechanism 40 in the direction of arrows B causes the hook 44 to swing in a direction (e.g., the direction of arrow C in FIG. 3) in which it becomes uncoupled from the striker 42 counter to the urging force of the urging means 48.

As shown in FIG. 1 and FIG. 2, a link mechanism 50 is provided along the vehicle vertical direction in the front end portion (i.e., on the front side door 12 side) of the rear side door 14, and the lower end portion of the link mechanism 50 is coupled to the lower door lock device 36. A rocker 80 that extends along the vehicle forward and rearward direction is provided in the lower portion of the vehicle body 11. A striker 52 (see FIG. 3) is provided in a position on the rocker 80 corresponding to the front end portion of the rear side door 14. It should be noted that the striker 52 is not shown in FIG. 1 and FIG. 2.

As shown in FIG. 3, one end portion 50A of the link mechanism 50 is coupled to the rear side door handle 32, and a hook 54 is coupled to the other end portion 50B. The hook 54 is swingably supported on a swing shaft 56. Furthermore, the hook 54 is urged, by urging means 58 such as a coil spring, for example, in a direction (e.g., the direction of arrow D in FIG. 3) in which it becomes coupled to the striker 52. Consequently, when the rear side door handle 32 is operated to open the rear side door 14, the movement of the link mechanism 50 in the direction of arrows E causes the hook 54 to swing in a direction (e.g., the direction of arrow F in FIG. 3) in which it becomes uncoupled from the striker 52 counter to the urging force of the urging means 58.

As shown in FIG. 1 and FIG. 2, a reinforcement 62 serving as a reinforcement member disposed in an oblique direction from the upper side of the lower door lock device 26 heading forward toward the lower portion as seen in a vehicle side view is provided inside the front side door 12 in the lower portion 12C on the rear end portion side (i.e., the rear side door 14 side) thereof. Furthermore, a reinforcement 64 serving as a reinforcement member disposed in an oblique direction from the upper side of the lower door lock device 36 heading rearward toward the lower portion as seen in a vehicle side view is provided inside the rear side door 14 in the lower portion 14C on the front end portion side (i.e., the front side door 12 side) thereof.

Figure 4:
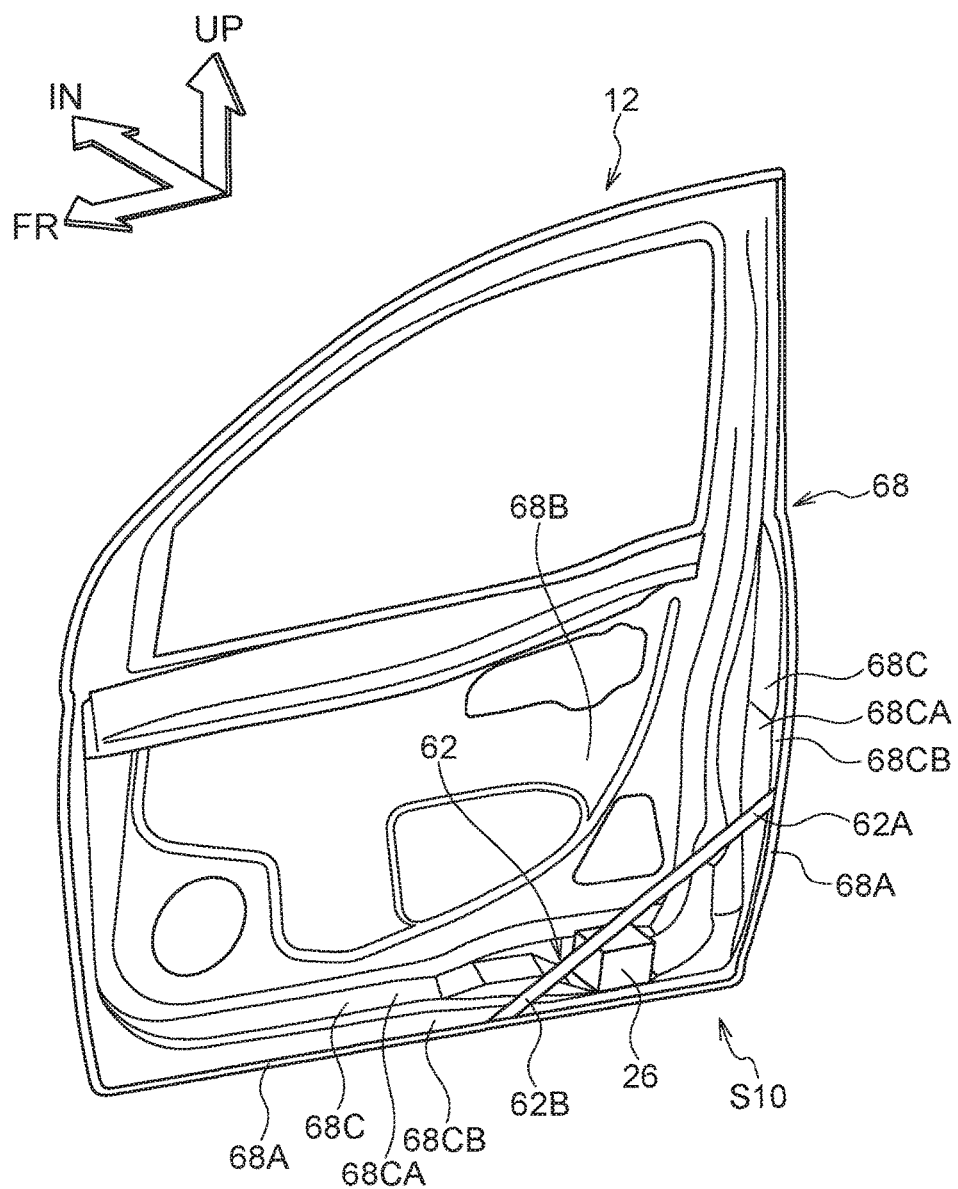
FIG. 4 is a perspective view showing, in a state in which a door outer panel is omitted, the front side door used in the vehicle side portion structure shown in FIG. 1.
Figure 5:
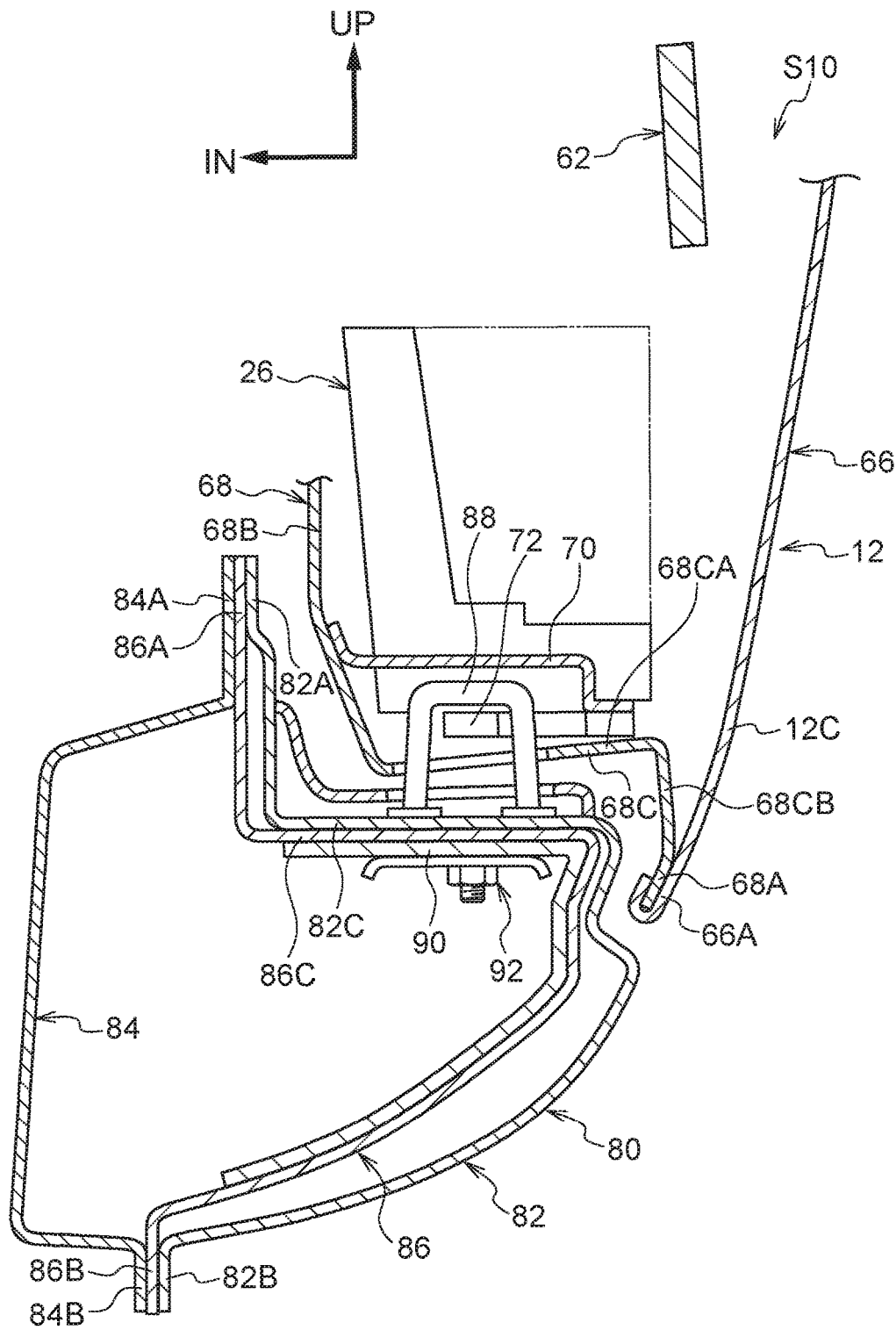
FIG. 5 is a sectional view showing the vehicle side portion structure along line 5-5 in FIG. 2.
Figure 6:
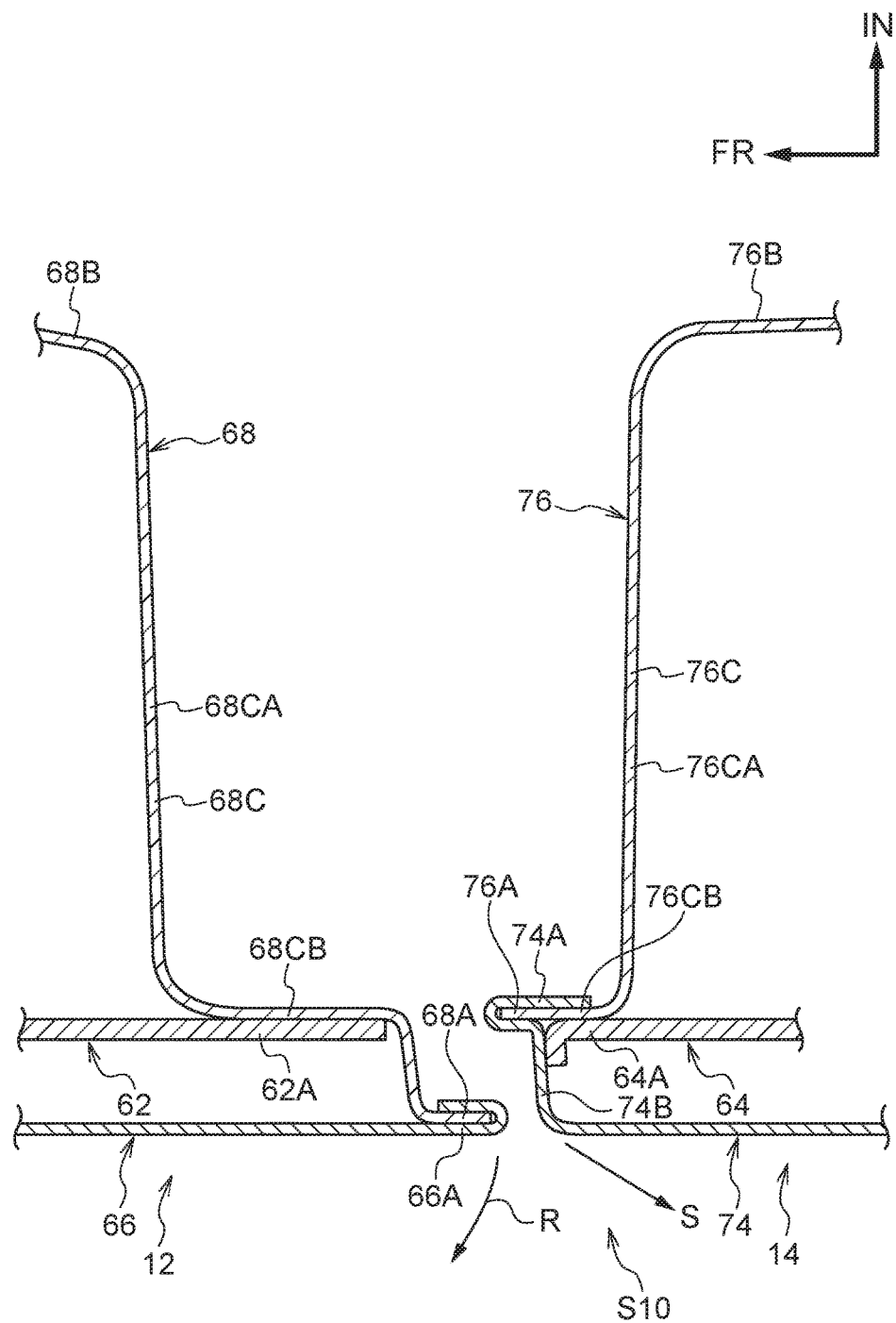
FIG. 6 is a sectional view showing the vehicle side portion structure along line 6-6 in FIG. 2.

As shown in FIG. 4 to FIG. 6, the front side door 12 is equipped with a door outer panel 66 (see FIG. 5 and FIG. 6) serving as an outer panel disposed on the vehicle width direction outer side and a door inner panel 68 serving as an inner panel disposed on the vehicle width direction inner side of the door outer panel 66. A terminal portion 66A of the peripheral edge of the door outer panel 66 is integrated by hemming to a terminal portion 68A of the peripheral edge of the door inner panel 68, and thus the door outer panel 66 and the door inner panel 68 are given a closed cross-sectional structure (see FIG. 5 and FIG. 6).

As shown in FIG. 4, the door inner panel 68 is equipped with an inner wall portion 68B disposed along the substantially vehicle vertical direction and the substantially vehicle forward and rearward direction on the vehicle width direction inner side and a peripheral edge portion 68C disposed so as to project outward in the vehicle width direction from the periphery of the inner wall portion 68B. More specifically, the peripheral edge portion 68C is equipped with a wall portion 68CA, which extends outward in the vehicle width direction from the periphery of the inner wall portion 68B and is disposed along the substantially vehicle width direction, and an edge wall portion 68CB, which is bent in a vehicle outward direction (i.e., outward in the vehicle forward and rearward direction or outward in the vehicle vertical direction) from the vehicle width direction outer end portion of the wall portion 68CA (see FIG. 5 and FIG. 6).

Additionally, the terminal portion 68A is formed via a step portion on the end edge of the edge wall portion 68CB (see FIG. 6).

The lower door lock device 26 is attached by means of a bracket 70 or the like (see FIG. 5) to the lower portion of the door inner panel 68.

At least part (in the first embodiment, the section on the vehicle rear side) of the reinforcement 62 is disposed on the upper side of the lower door lock device 26. One end portion (i.e., the rear end portion) 62A of the reinforcement 62 is joined to the peripheral edge portion 68C of the side portion of the rear end (i.e., the rear side door 14 side) of the door inner panel 68. In the first embodiment, the one end portion 62A of the reinforcement 62 is joined by welding or the like to the edge wall portion 68CB of the side portion of the rear end of the door inner panel 68 (see FIG. 6). Furthermore, the other end portion (i.e., the front end portion) 62B of the reinforcement 62 is joined to the peripheral edge portion 68C of the lower portion of the vehicle forward and rearward direction middle portion of the door inner panel 68. In the first embodiment, the other end portion 62B of the reinforcement 62 is joined by welding or the like to the edge wall portion 68CB of the lower portion of the door inner panel 68. Because of this, the lower door lock device 26 is surrounded by the reinforcement 62 and the peripheral edge portion 68C of the rear portion and lower portion of the door inner panel 68.

In the first embodiment, the reinforcement 62 is made of a long plate-like member. It should be noted that one or plural bent portions bent in a direction intersecting the lengthwise direction of the reinforcement 62 may also be provided in the reinforcement 62. In other words, one or plural bent portions are disposed along the lengthwise direction of the reinforcement 62. Because of this, the rigidity of the reinforcement 62 can be improved.

As shown in FIG. 4 and FIG. 5, the reinforcement 62 is disposed inside the front side door 12 on the vehicle width direction outer side of the lower door lock device 26.

As shown in FIG. 5, the rocker 80 is equipped with an outer panel 82 disposed on the vehicle width direction outer side and an inner panel 84 disposed on the vehicle width direction inner side of the outer panel 82. A reinforcement 86 is disposed between the outer panel 82 and the inner panel 84. The outer panel 82 and the reinforcement 86 are each formed in a cross-sectionally substantially hat shape that opens inward in the vehicle width direction. The inner panel 84 is formed in a cross-sectionally substantially hat shape that opens outward in the vehicle width direction. Upper flange portions 82A, 86A, and 84A that extend in the vehicle upward direction are provided on the upper portions of the outer panel 82, the reinforcement 86, and the inner panel 84, respectively. Lower flange portions 82B, 86B, and 84B that extend in the vehicle downward direction are provided on the lower portions of the outer panel 82, the reinforcement 86, and the inner panel 84, respectively. Additionally, the upper flange portions 82A, 86A, and 84A are laid on top of each other and joined by welding or the like to each other, and the lower flange portions 82B, 86B, and 84B are laid on top of each other and joined by welding or the like to each other. Because of this, the rocker 80 is given a closed cross-sectional structure.

A horizontal wall portion 82C and a horizontal wall portion 86C that are disposed along the substantially vehicle forward and rearward direction and the substantially vehicle width direction are provided in the vertical direction middle portions of the outer panel 82 and the reinforcement 86, respectively. The horizontal wall portion 82C and the horizontal wall portion 86C are disposed in a state in which they are laid on top of each other, and a striker 88 is attached to the upper surface of the horizontal wall portion 82C. The striker 88 is attached to the horizontal wall portion 82C and the horizontal wall portion 86C using a bracket 90 and a fastener 92.

Furthermore, a latch 72 is provided in the lower door lock device 26, and the latch 72 is configured to be swingable between a locked position and an unlocked position by an actuator (not shown in the drawings). The working of the actuator is controlled by an ECU (not shown in the drawings) serving as control means connected to the door controller 20 (see FIG. 1 and FIG. 2). When the latch 72 swings to the locked position, it engages with the striker 88.

As shown in FIG. 1 and FIG. 2, when the front side door 12 is closed, at least part of the reinforcement 62 overlaps with the rocker 80 as seen in a vehicle side view. More specifically, when the front side door 12 is closed, the other end portion 62B of the reinforcement 62 overlaps with the upper portion of the rocker 80 (e.g., the upper flange portions 82A, 86A, and 84A shown in FIG. 5) as seen in a vehicle side view.

As shown in FIG. 6, the rear side door 14 is equipped with a door outer panel 74 serving as an outer panel disposed on the vehicle width direction outer side and a door inner panel 76 serving as an inner panel disposed on the vehicle width direction inner side of the door outer panel 74. A terminal portion 74A of the peripheral edge of the door outer panel 74 is integrated by hemming with a terminal portion 76A of the peripheral edge of the door inner panel 76, and thus the door outer panel 74 and the door inner panel 76 are given a closed cross-sectional structure.

The door inner panel 76 is equipped with an inner wall portion 76B disposed in the substantially vehicle vertical direction and the substantially vehicle forward and rearward direction on the vehicle width direction inner side and a peripheral edge portion 76C disposed so as to project outward in the vehicle width direction from the periphery of the inner wall portion 76B. More specifically, the peripheral edge portion 76C is equipped with a wall portion 76CA, which extends outward in the vehicle width direction from the periphery of the inner wall portion 76B and is disposed along the substantially vehicle width direction, and an edge wall portion 76CB, which is bent in a vehicle outward direction (i.e., outward in the vehicle forward and rearward direction or outward in the vehicle vertical direction) from the vehicle width direction outer end portion of the wall portion 76CA. It should be noted that FIG. 6 shows only the front end portion of the door inner panel 76. Additionally, the terminal portion 76A is formed on a substantial extension line of the edge wall portion 76CB.

The lower door lock device 36 (see FIG. 1) is attached by a bracket and the like (not shown in the drawings) to the lower portion of the door inner panel 76.

Furthermore, the door outer panel 74 is equipped with a peripheral edge portion 74B bent inward in the vehicle width direction, and the terminal portion 74A is formed on the end edge of the peripheral edge portion 74B.

As shown in FIG. 2, at least part (in the first embodiment, the section on the vehicle front side) of the reinforcement 64 is disposed on the upper side of the lower door lock device 36. One end portion (i.e., the front end portion) 64A of the reinforcement 64 is joined to the peripheral edge portion of the side portion of the front end (i.e., the front side door 12 side) of the rear side door 14 (see FIG. 6). More specifically, as shown in FIG. 6, the one end portion 64A of the reinforcement 64 is bent in a substantially L-shape outward in the vehicle width direction and is joined by welding or the like to the edge wall portion 76CB of the door inner panel 76 and the peripheral edge portion 74B of the door outer panel 74. That is, the one end portion 64A of the reinforcement 64 is joined to both the door inner panel 76 and the door outer panel 74. Furthermore, as shown in FIG. 2, the other end portion (i.e., the rear end portion) 64B of the reinforcement 64 is joined to the peripheral edge portion of the lower portion of the vehicle forward and rearward direction middle portion of the rear side door 14. Although it is not shown in the drawings, the other end portion 64B of the reinforcement 64 is bent in a substantially L-shape outward in the vehicle width direction and is joined by welding or the like to the edge wall portion 76CB of the door inner panel 76 and the peripheral edge portion 74B of the door outer panel 74. That is, the other end portion 64B of the reinforcement 64 is joined to both the door inner panel 76 and the door outer panel 74.

The reinforcement 64 is disposed inside the rear side door 14 on the vehicle width direction outer side of the lower door lock device 36.

When the rear side door 14 is closed, at least part (in the first embodiment, the other end portion 64B; that is, the lower end portion on the rear side) of the reinforcement 64 overlaps with the upper portion of the rocker 80 (e.g., the upper flange portions 82A, 86A, and 84A shown in FIG. 5) as seen in a vehicle side view (see FIG. 1 and FIG. 2).

Next, the action and effects of the first embodiment will be described.

In the vehicle side portion structure S10, the front side door 12 and the rear side door 14 serving as front and rear side doors are provided in the side portion of the vehicle 10 that does not have a center pillar. The lower door lock device 26 is disposed in the vehicle vertical direction lower portion of the front side door 12 on the rear side door 14 side. Additionally, when the front side door 12 is closed, the lower door lock device 26 engages with the striker 88 provided on the rocker 80 serving as the vehicle body to thereby lock the front side door 12 (see FIG. 5). Furthermore, the lower door lock device 36 is disposed in the vehicle vertical direction lower portion of the rear side door 14 on the front side door 12 side. Additionally, when the rear side door 14 is closed, the lower door lock device 36 engages with the striker 52 provided on the rocker 80 serving as the vehicle body to thereby lock the rear side door 14 (see FIG. 3).

Furthermore, the reinforcement 62 is provided inside the front side door 12 in the vehicle vertical direction lower portion thereof, and at least part of the reinforcement 62 is disposed on the upper side of the lower door lock device 26. In the first embodiment, the one end portion 62A of the reinforcement 62 is joined to the peripheral edge portion 68C of the side portion of the rear end of the front side door 12, and the other end portion 62B of the reinforcement 62 is joined to the peripheral edge portion 68C of the lower portion of the front side door 12 (see FIG. 4). That is, the lower door lock device 26 is surrounded by the reinforcement 62 and the peripheral edge portion 68C of the rear portion and lower portion of the front side door 12 as seen in a vehicle side view. Because of this, the lower door lock device 26 is effectively protected by the reinforcement 62 and the peripheral edge portion 68C of the rear portion and lower portion of the front side door 12. For this reason, the load at the time of a side impact to the vehicle 10 is kept from being transmitted to the lower door lock device 26 disposed in the vehicle vertical direction lower portion of the front side door 12. Consequently, for example, the lower door lock device 26 of the front side door 12 can be kept from being unlocked by the load at the time of a side impact.

Furthermore, the reinforcement 64 is provided inside the rear side door 14 in the vehicle vertical direction lower portion thereof, and at least part of the reinforcement 64 is disposed on the upper side of the lower door lock device 36 (see FIG. 2). In the first embodiment, the one end portion 64A of the reinforcement 64 is joined to the peripheral edge portions 74B and 76C of the side portion of the front end of the rear side door 14 (see FIG. 6), and the other end portion 64B of the reinforcement 64 is joined to the peripheral edge portions 74B and 76C of the lower portion of the rear side door 14. That is, the lower door lock device 36 is surrounded by the reinforcement 64 and the peripheral edge portions 74B and 76C of the front portion and lower portion of the rear side door 14 as seen in a vehicle side view. Because of this, at the time of a side impact to the vehicle 10 the lower door lock device 36 is effectively protected by the reinforcement 64 and the peripheral edge portions 74B and 76C of the front portion and lower portion of the rear side door 14. For this reason, the load at the time of a side impact to the vehicle 10 is kept from being transmitted to the lower door lock device 36 disposed in the vehicle vertical direction lower portion of the rear side door 14. Consequently, for example, the lower door lock device 36 of the rear side door 14 can be kept from being unlocked by the load at the time of a side impact.

Furthermore, in the vehicle side portion structure S10, the reinforcement 62 is disposed inside the front side door 12 on the vehicle width direction outer side of the lower door lock device 26, so the load at the time of a side impact is input at an early stage to the reinforcement 62, and the load is dispersed to the peripheral edge portion 68C of the front side door 12 (see FIG. 4). For this reason, the load at the time of a side impact can be effectively kept from being transmitted to the lower door lock device 26.

Similarly, in the vehicle side portion structure S10, the reinforcement 64 is disposed inside the rear side door 14 on the vehicle width direction outer side of the lower door lock device 36, so the load at the time of a side impact is input at an early stage to the reinforcement 64, and the load is dispersed to the peripheral edge portions 74B and 76C of the rear side door 14. For this reason, the load at the time of a side impact can be effectively kept from being transmitted to the lower door lock device 36.

Furthermore, in the vehicle side portion structure S10, the rear side door 14 is equipped with the door inner panel 76 disposed on the vehicle width direction inner side and the door outer panel 74 disposed on the vehicle width direction outer side of the door inner panel 76. The reinforcement 64 is joined to both the peripheral edge portion 76C of the door inner panel 76 and the peripheral edge portion 74B of the door outer panel 74. Because of this, the reinforcement 64 can be more stably supported by the door inner panel 76 and the door outer panel 74 compared to a case where the reinforcement 64 is joined only to one of the door inner panel and the door outer panel.

Furthermore, in the vehicle side portion structure S10, the rocker 80 extends along the vehicle forward and rearward direction in the vehicle vertical direction lower portion of the side portion of the vehicle 10. Additionally, when the front side door 12 is closed, at least part (in the first embodiment, the other end portion 62B; that is, the lower end portion on the front side) of the reinforcement 62 overlaps with the rocker 80 as seen in a vehicle side view. Because of this, some of the load at the time of a side impact is transmitted via the reinforcement 62 to the rocker 80, and the impact load can be supported by the frame of the vehicle body 11. For this reason, the lower door lock device 26 can be efficiently protected.

Similarly, in the vehicle side portion structure S10, when the rear side door 14 is closed, at least part (in the first embodiment, the other end portion 64B; that is, the lower end portion on the rear side) of the reinforcement 64 overlaps with the rocker 80 as seen in a vehicle side view. Because of this, some of the load at the time of a side impact is transmitted via the reinforcement 64 to the rocker 80, and the impact load can be supported by the frame of the vehicle body 11. For this reason, the lower door lock device 36 can be efficiently protected.

Moreover, in the vehicle side portion structure S10, the one end portion 62A of the reinforcement 62 is joined to the peripheral edge portion 68C on the rear side door 14 side of the front side door 12, and the other end portion 62B of the reinforcement 62 is joined to the peripheral edge portion 68C of the vehicle vertical direction lower portion of the front side door 12. Because of this, a closed region that is substantially triangular in shape is formed by the corner portion of the peripheral edge portion 68C on the lower side of the front side door 12 and the reinforcement 62, and at the time of a side impact the load can be dispersed by the sides of the substantial triangle. For this reason, the lower door lock device 26 disposed in the vehicle vertical direction lower portion of the front side door 12 can be more reliably protected. Similarly, in the rear side door 14 also, a closed region that is substantially triangular in shape is formed by the corner portion of the peripheral edge portions 74B and 76C on the lower side of the rear side door 14 and the reinforcement 64, and at the time of a side impact the load can be dispersed by the section of the substantial triangle. For this reason, the lower door lock device 36 disposed in the vehicle vertical direction lower portion of the rear side door 14 can be more reliably protected.

Second Embodiment

Figure 7:
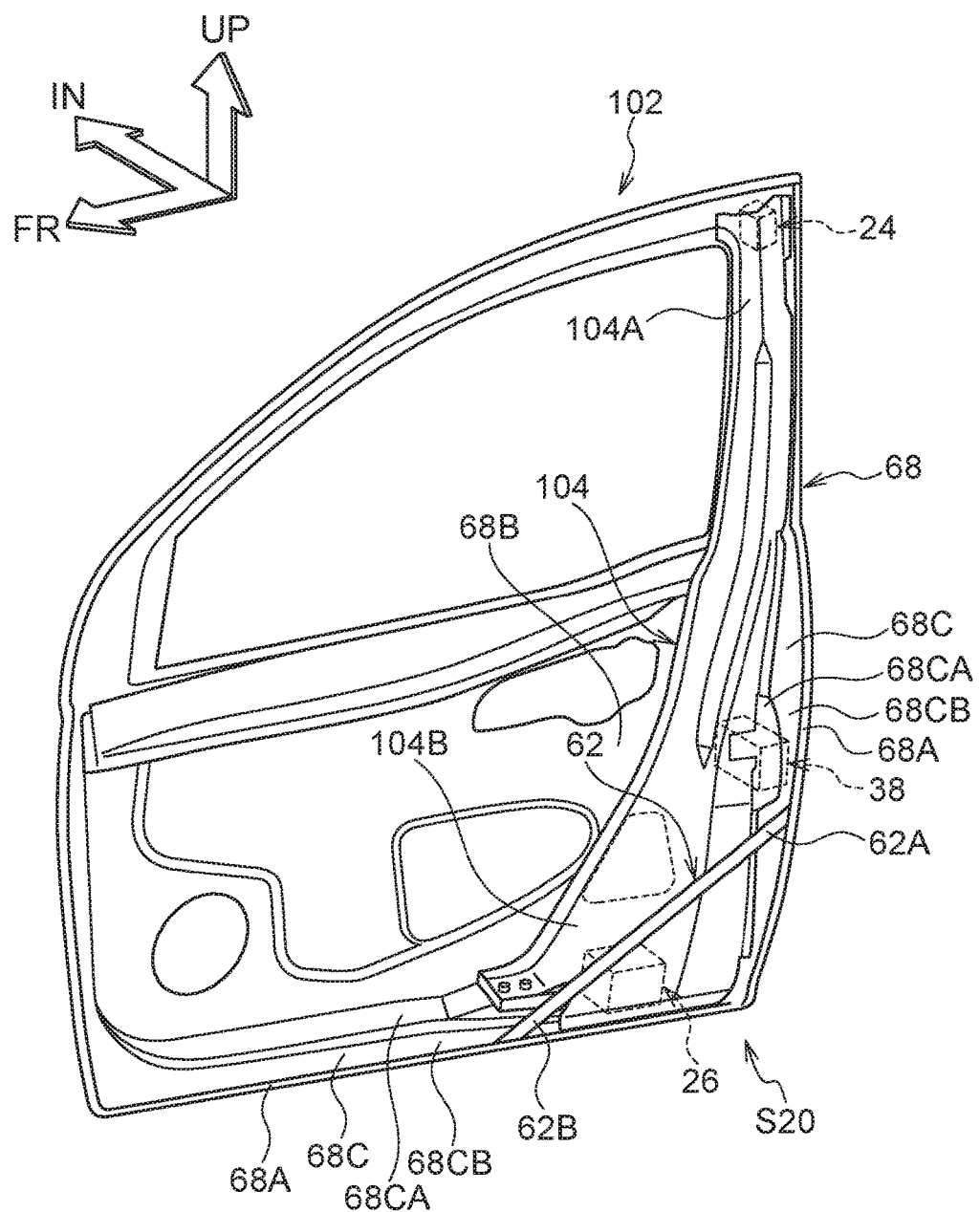
FIG. 7 is a perspective view showing, in a state in which a door outer panel is omitted, a front side door used in a vehicle side portion structure pertaining to a second embodiment.

In FIG. 7 is shown a front side door 102 to which a vehicle side portion structure S20 of a second embodiment is applied. It should be noted that identical numbers will be assigned to constituent parts that are identical to those in the first embodiment and that description of those identical constituent parts will be omitted.

As shown in FIG. 7, in the front side door 102 serving as a side door, as a configuration different from that of the front side door 12 of the first embodiment, a reinforcement 104 is provided along the vehicle vertical direction on the rear end portion of the door inner panel 68 of the front side door 102. More specifically, the reinforcement 104 is provided along the vehicle vertical direction, from the upper end portion to the lower end portion of the door inner panel 68, on the rear end portion of the door inner panel 68. An upper end portion 104A of the reinforcement 104 is joined to the upper end portion of the door inner panel 68 by fasteners such as bolts. Furthermore, a lower end portion 104B of the reinforcement 104 is joined to the lower end portion of the door inner panel 68 by fasteners such as bolts.

The upper door lock device 24 is provided on the vehicle width direction inner side of the upper end portion 104A of the reinforcement 104. The door coupling device 38 is provided on the vehicle width direction inner side of the vertical direction middle portion of the reinforcement 104. The lower door lock device 26 is provided on the vehicle width direction inner side of the lower end portion 104B of the reinforcement 104. In the second embodiment, the vehicle forward and rearward direction width of the lower end portion 104B of the reinforcement 104 is larger than the vehicle forward and rearward direction width of the upper end portion 104A of the reinforcement 104. Because of this, the reinforcement 104 is disposed so as to cover the upper door lock device 24, the door coupling device 38, and the lower door lock device 26 from the vehicle width direction outer side. At the time of a side impact to the vehicle, the reinforcement 104 disperses the load in the vehicle vertical direction.

In the vehicle side portion structure S20, the reinforcement 62 serving as a reinforcement member is provided in the front side door 102 on the vehicle width direction outer side of the reinforcement 104. The configuration of the reinforcement 62 is the same as the configuration in the first embodiment.

In this vehicle side portion structure S20, in addition to the effects of the vehicle side portion structure S10 of the first embodiment, the load at the time of a side impact to the vehicle is transmitted from the reinforcement 62 to the reinforcement 104. That is, at the time of a side impact to the vehicle, the load transmitted to the reinforcement 62 is transmitted to the reinforcement 104 disposed on the vehicle width direction inner side of the reinforcement 62 and is dispersed in the vehicle vertical direction by the reinforcement 104. For this reason, the load at the time of a side impact is kept from being transmitted to the lower door lock device 26 disposed in the vehicle vertical direction lower portion of the front side door 102, and the lower door lock device 26 can be more reliably protected.

It should be noted that although in the second embodiment the configuration of the front side door 102 is described, the present disclosure is not limited to this. For example, a reinforcement disposed along the vehicle vertical direction and secured to the upper portion and the lower portion of the rear side door 14 may also be provided in the rear side door 14 on the vehicle width direction inner side of the reinforcement 64.

Third Embodiment

Figure 8:
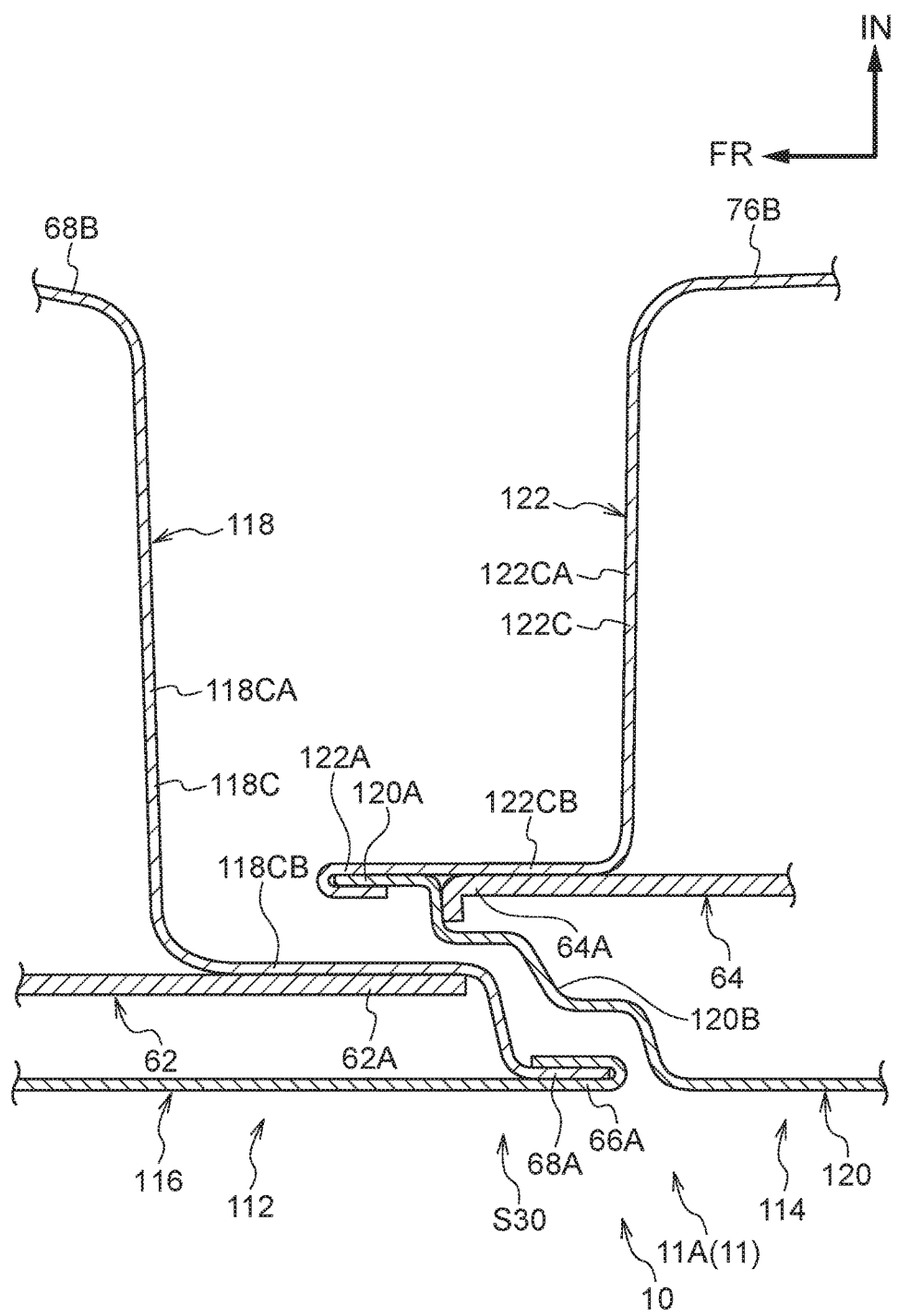
FIG. 8 is a sectional view, along the vehicle forward and rearward direction and the vehicle width direction, showing a vehicle side portion structure pertaining to a third embodiment.

In FIG. 8 is shown a front side door and a rear side door serving as front and rear side doors to which a vehicle side portion structure S30 of a third embodiment has been applied. It should be noted that identical numbers will be assigned to constituent parts that are identical to those in the first and second embodiments and that description of those identical constituent parts will be omitted.

As shown in FIG. 8, the vehicle 10 of the third embodiment is a center-pillar-less vehicle that does not have a center pillar, and in the side portion 11A of the vehicle body 11 thereof are provided a front side door 112 and a rear side door 114 serving as front and rear side doors. The front side door 112 is equipped with a door outer panel 116 serving as an outer panel disposed on the vehicle width direction outer side and a door inner panel 118 serving as an inner panel disposed on the vehicle width direction inner side of the door outer panel 116.

The rear end portions of the door outer panel 116 and the door inner panel 118 extend further in the vehicle rearward direction than those of the door outer panel 66 and the door inner panel 68 of the first embodiment (see FIG. 6). More specifically, a peripheral edge portion 118C of the door inner panel 118 is equipped with a wall portion 118CA, which extends outward in the vehicle width direction from the periphery of the inner wall portion 68B and is disposed along the substantially vehicle width direction, and an edge wall portion 118CB, which extends in the vehicle rearward direction from the vehicle width direction outer end portion of the wall portion 118CA. The vehicle forward and rearward direction length of the edge wall portion 118CB is longer than the vehicle forward and rearward direction length of the edge wall portion 68CB of the first embodiment (see FIG. 6). Additionally, the terminal portion 68A is formed via a step portion on the end edge of the edge wall portion 118C. The one end portion 62A (that is, the rear end portion) of the reinforcement 62 is joined to the edge wall portion 118CB.

The rear side door 114 is equipped with a door outer panel 120 serving as an outer panel disposed on the vehicle width direction outer side and a door inner panel 122 serving as an inner panel disposed on the vehicle width direction inner side of the door outer panel 120. The front end portions of the door outer panel 120 and the door inner panel 122 extend further in the vehicle forward direction than those of the door outer panel 74 and the door inner panel 76 of the first embodiment (see FIG. 6). More specifically, a peripheral edge portion 122C of the door inner panel 122 is equipped with a wall portion 122CA, which extends outward in the vehicle width direction from the periphery of the inner wall portion 76B and is disposed along the substantially vehicle width direction, and an edge wall portion 122CB, which extends in the vehicle forward direction from the vehicle width direction outer end portion of the wall portion 118CA. The vehicle forward and rearward direction length of the edge wall portion 122CB is longer than the vehicle forward and rearward direction length of the edge wall portion 76CB of the first embodiment (see FIG. 6). Additionally, a terminal portion 122A is formed continuously with the edge wall portion 122CB.

Furthermore, in the door outer panel 120 a peripheral edge portion 120B bent in a stepwise fashion is formed on the vehicle width direction inner side in correspondence to the shape of the front side door 112. In the third embodiment, the peripheral edge portion 120B is bent in three steps. The peripheral edge portion 120B extends further in the vehicle forward direction and further inward in the vehicle width direction than the peripheral edge portion 74B of the first embodiment (see FIG. 6). Additionally, a terminal portion 120A integrated with the terminal portion 122A of the door inner panel 122 is formed in the front end portion of the peripheral edge portion 120B. The one end portion 64A (that is, the front end portion) of the reinforcement 64 is joined by welding or the like to the edge wall portion 122CB of the door inner panel 122 and the peripheral edge portion 120B of the door outer panel 120.

In the vehicle side portion structure S30, when the front side door 112 and the rear side door 114 are closed, at least part (in the third embodiment, the one end portion 62A) of the reinforcement 62 of the front side door 112 overlaps with the front end portion of the rear side door 114 as seen in a vehicle side view. Furthermore, when the front side door 112 and the rear side door 114 are closed, at least part (in the third embodiment, the one end portion 64A) of the reinforcement 64 of the rear side door 114 overlaps with the rear end portion of the front side door 112 as seen in a vehicle side view.

In this vehicle side portion structure S30, in addition to the effects of the vehicle side portion structure S10 of the first embodiment, the load at the time of a side impact to the vehicle 10 is transmitted from the reinforcement 62 of the front side door 112 to the rear side door 114. For this reason, the impact load can be supported by both the front side door 112 and the rear side door 114. Moreover, in the third embodiment, the impact load is transmitted to the reinforcement 64 of the rear side door 114, so the lower door lock device 26 (see FIG. 1) of the front side door 112 and the lower door lock device 36 (see FIG. 1) of the rear side door 114 can be more reliably protected.

In the first to third embodiments, the reinforcements 62 and 64 are made of long plate-like members, but the present disclosure is not limited to this shape for the reinforcements 62 and 64, and the cross-sectional shape of the reinforcements can be changed. For example, the reinforcements may also be circular or polygonal pipes (hollow members), circular or polygonal solid rods, bent panels, or wide panels. The attachment position of the peripheral edge portion of the front side door and the attachment position of the peripheral edge portion of the rear side door can also be changed in accordance with the shape of the reinforcements. Furthermore, the reinforcements may also be attached to the peripheral edge portion of the front side door and the peripheral edge portion of the rear side door by fasteners or the like using brackets.

Furthermore, in the first to third embodiments, the lower door lock device 26 and the reinforcement 62 are provided in the front side door, and the lower door lock device 36 and the reinforcement 64 are provided in the rear side door, but the present disclosure is not limited to this configuration. For example, the lower door lock device and the reinforcement serving as the reinforcement member may also be provided in either one of the front side door and the rear side door.

Furthermore, in the first to third embodiments, the configurations of the lower door lock device 26, the upper door lock device 24, and the door coupling device 38 in the front side door are not limited to the configurations in these embodiments and can be changed. Furthermore, the upper door lock device 24 and the door coupling device 38 are provided in the front side door, but the position and number of the lock device(s) in the front side door can be changed. Furthermore, the configurations of the lower door lock device 36 and the rear door lock device 34 in the rear side door are not limited to the configurations in the embodiments and can be changed. Moreover, the rear door lock device 34 is provided in the rear side door, but the position and number of the lock device(s) in the rear side door can be changed.

Furthermore, in the first to third embodiments, the lower door lock device 26 in the front side door has a configuration where it becomes engaged with the rocker 80 (in the embodiments, a striker provided on the rocker 80) serving as the vehicle body, but the present disclosure is not limited to this configuration. For example, the lower door lock device in the front side door may also have a configuration where it becomes engaged with the rear side door (e.g., a striker provided in the rear side door) and locked. Furthermore, the lower door lock device 36 in the rear side door has a configuration where it becomes engaged with the rocker 80 (in the embodiments, a striker provided on the rocker 80) serving as the vehicle body, but the present disclosure is not limited to this configuration. For example, the lower door lock device in the rear side door may also have a configuration where it becomes engaged with the front side door (e.g., a striker provided in the front side door) and locked.

Moreover, in the first to third embodiments, the reinforcement 64 provided in the rear side door is joined to both the peripheral edge portion of the door inner panel and the peripheral edge portion of the door outer panel, but the present disclosure is not limited to this configuration. For example, the reinforcement 62 provided in the front side door may also have a configuration where it is joined to both the peripheral edge portion of the door inner panel and the peripheral edge portion of the door outer panel.

The disclosure of Japanese Patent Application No. 2016-089606 filed on Apr. 27, 2016 is incorporated in its entirety herein by reference.

All documents, patent applications, and technical standards mentioned in this specification are incorporated herein by reference to the same extent as if each individual document, patent application, and technical standard were specifically and individually indicated to be incorporated by reference.

What is claimed is:

1. A vehicle side portion structure comprising:
a front side door and a rear side door provided at a side portion of a vehicle that does not have a center pillar;
a lock member provided at at least one side door of the front side door and the rear side door, the lock member being disposed at a vehicle vertical direction lower portion of the one side door on a side of the other side door and, when the one side door is closed, engaging with the other side door or a body of the vehicle to thereby lock the one side door; and
a reinforcement member provided inside the one side door at the vehicle vertical direction lower portion with at least a part of the reinforcement member being disposed on an upper side of the lock member so that the lock member is surrounded by the reinforcement member and a peripheral edge portion of the one side door as seen in a side view of the vehicle,
wherein:
when the front side door and the rear side door are closed, at least the part of the reinforcement member overlaps with the other side door as seen in the side view of the vehicle.

2. The vehicle side portion structure according to claim 1, wherein the reinforcement member is disposed on a vehicle width direction outer side of the lock member.

3. The vehicle side portion structure according to claim 1, wherein:
the one side door comprises an inner panel disposed on a vehicle width direction inner side and an outer panel disposed on a vehicle width direction outer side of the inner panel, and the reinforcement member is joined to both the inner panel and the outer panel.

4. The vehicle side portion structure according to claim 1, wherein:
a rocker extends along a vehicle forward and rearward direction at a vehicle vertical direction lower portion of the side portion of the vehicle, and when the one side door is closed, at least part of the reinforcement member overlaps with the rocker as seen in a side view of the vehicle.

5. The vehicle side portion structure according to claim 1, wherein:
inside the one side door, another reinforcement member is provided, which is disposed along the vehicle vertical direction on a vehicle width direction outer side of the lock member and joined to an upper end portion and a lower end portion of the one side door, and the reinforcement member is disposed on the vehicle width direction outer side of the another reinforcement member.

6. A vehicle side portion structure comprising:
a front side door and a rear side door provided at a side portion of a vehicle that does not have a center pillar;
a lock member provided at at least one side door of the front side door and the rear side door, the lock member being disposed at a vehicle vertical direction lower portion of the one side door on a side of the other side door and, when the one side door is closed, engaging with the other side door or a body of the vehicle to thereby lock the one side door; and
a reinforcement member provided inside the one side door at the vehicle vertical direction lower portion with at least a part of the reinforcement member being disposed on an upper side of the lock member so that the lock member is surrounded by the reinforcement member and a peripheral edge portion of the one side door as seen in a side view of the vehicle,
wherein:
one end portion of the reinforcement member is joined to a peripheral edge portion of the one side door on the side of the other side door, and another end portion of the reinforcement member is joined to the peripheral edge portion of the vehicle vertical direction lower portion of the one side door.

7. The vehicle side portion structure according to claim 6, wherein the reinforcement member is disposed on an outer side of the lock member in a vehicle width direction.

8. The vehicle side portion structure according to claim 6, wherein:
the one side door comprises an inner panel disposed on a vehicle width direction inner side and an outer panel disposed on a vehicle width direction outer side of the inner panel, and the reinforcement member is joined to both the inner panel and the outer panel.

9. The vehicle side portion structure according to claim 6, wherein:
a rocker extends along a vehicle forward and rearward direction at a vehicle vertical direction lower portion of the side portion of the vehicle, and when the one side door is closed, at least part of the reinforcement member overlaps with the rocker as seen in a side view of the vehicle.

10. The vehicle side portion structure according to claim 6, wherein:
inside the one side door, another reinforcement member is provided, which is disposed along the vehicle vertical direction on a vehicle width direction outer side of the lock member and joined to an upper end portion and a lower end portion of the one side door, and the reinforcement member is disposed on the vehicle width direction outer side of the another reinforcement member.

* * * * *